Figure 1:
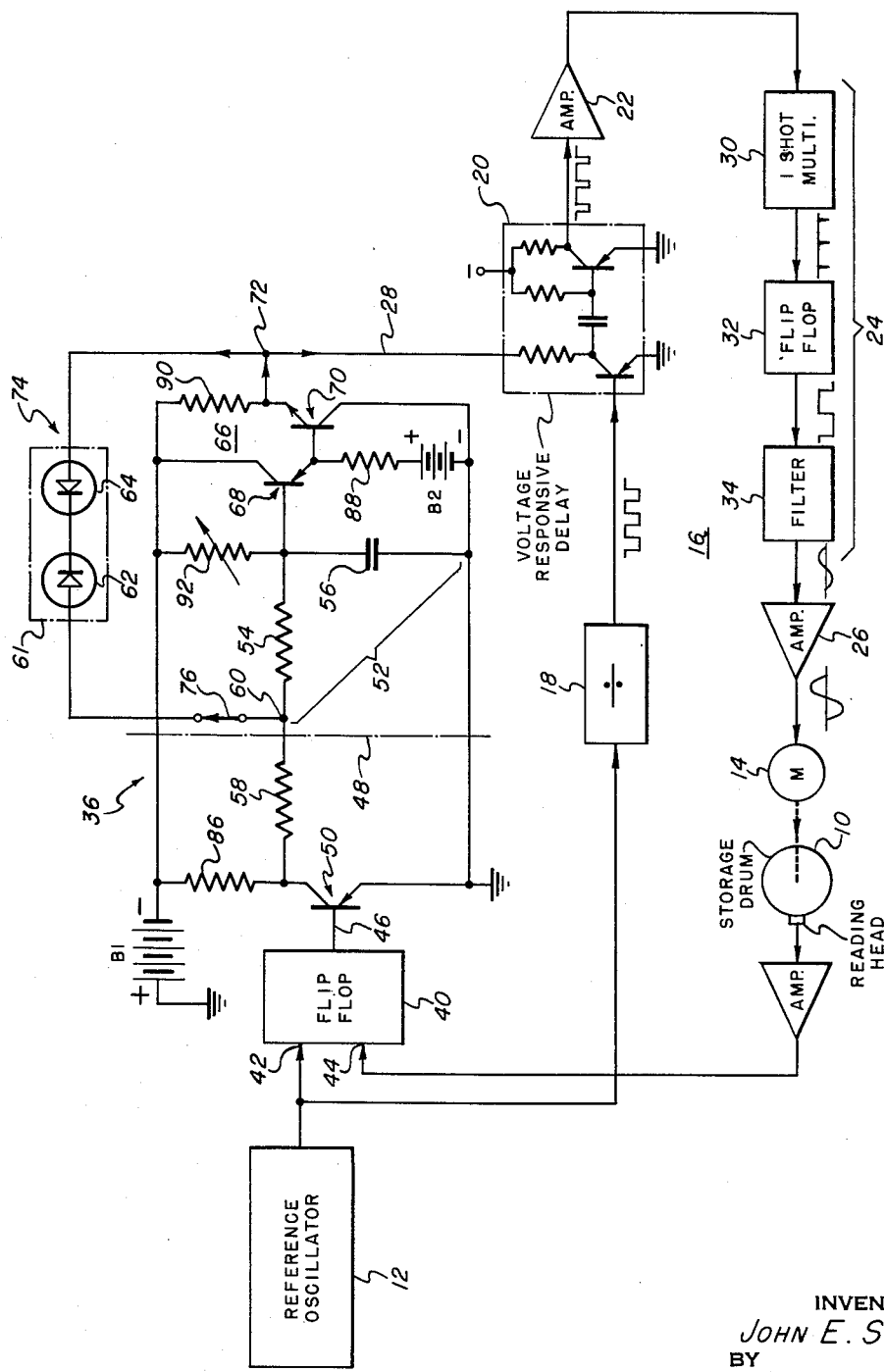

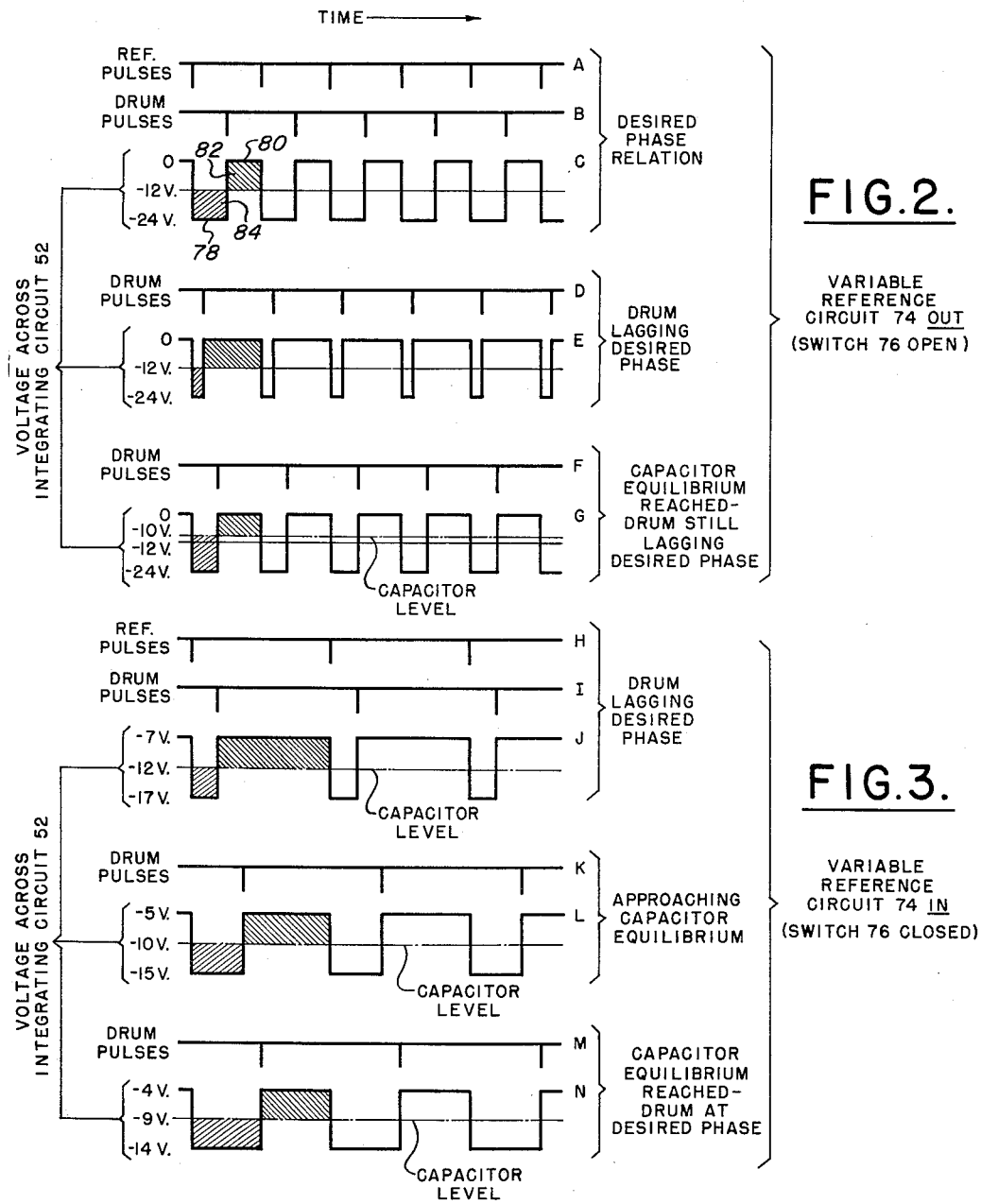

United States Patent Office 3,008,075
Patented Nov. 7, 1961

3,008,075
PHASE STABILIZING CIRCUIT
John E. Scott, Rego Park, N.Y., assignor to Sperry Rand Corporation, Great Neck, N.Y., a corporation of Delaware
Filed May 4, 1959, Ser. No. 810,747
12 Claims. (Cl. 318—314)

This invention relates to phase stabilization of a cyclic occurrence, and more particularly to apparatus for maintaining a predetermined phase relation between a reference frequency and the instantaneous angular position of a rotating magnetic storage drum.

In a digital computer, the real value of an information bit stored in a rotating magnetic storage drum is determined by its state and temporal position, especially as related to the rhythmic operation of the computer under the control of a master clock to which the time positions of all data bits are referenced. Thus, in systems where the master clock is not derived from the drum, it is important to regulate not only the speed of the drum, but also its phase or time position with respect to cyclic reference signals. In a general way, this is accomplished by a regulating loop which controls the phase of the drum in response to the output of a phase discriminator that compares the phase of the reference frequency with the phase of marker pulses derived in response to drum rotation and having a frequency proportional to the speed of rotation of the drum. An output voltage from the phase discriminator indicative of phase divergence is applied to control apparatus for appropriately shifting the instantaneous angular position of the drum thereby to stabilize the angular position of the drum relative to the reference frequency.

One form of phase discriminator may include a rectangular wave generator, which in response to the reference frequency and the marker pulses provides rectangular output waves having oppositely going portions whose relative durations are indicative of the phase relation between the reference frequency and the marker pulses. The term "oppositely going" as used herein with reference to pulses or to portions of a wave means excursions in opposite directions from each other, regardless of their directions with respect to any particular reference value. Because these rectangular waves indicate the relative times of the reference and drum pulses, i.e., their phase relation, they may conveniently be referred to as phase indicating waves, and their generator may be called a phase comparator. To detect the time dissymmetry, if any, of the rectangular phase indicating wave, it is fed to a time discriminator of the type in which the average D.-C. level on a capacitor is made to vary as a function of the time differential of the respective durations of the oppositely going portions of the wave.

In systems of the type under consideration in which the stable loop condition occurs when the average capacitor currents during the respective oppositely going portions of the phase indicating wave applied across the integrating circuit including the capacitor are equal, i.e., when the net charge variation on the capacitor is zero, the desirable operation for repetitive accuracy is one in which any incremental input to the capacitor is dependent solely upon the time differential parameter. This is not possible in prior proposed systems because the charging voltage applied to the integrating circuit including the capacitor is allowed to swing only around a fixed reference, the mean of the voltage extremes of the phase indicating wave. Loop stability may not always result in the same D.C. level from the capacitor because of uncontrollable variations in the circuit component values and other conditions, and in such case, the time differential parameter may reduce to the equivalence of zero as manifested by zero average incremental change over the oppositely going portions of the rectangular phase indicating wave, although the relative phase between the reference and the marker pulses is not the desired one. It should be apparent that as the capacitor level changes, the incremental charge applied thereto by a voltage wave which oscillates around a fixed reference cannot be solely a function of a time parameter, but must also be related to the exponentially changing level of the capacitor. Thus, if there is any variation in time constants, the reference and marker pulses will not be exactly in the desired phase relation.

In accordance with the present invention, the foregoing difficulties are overcome by subjecting the capacitor to a phase indicating voltage wave with oppositely going portions having the same time parameters as those of the previously described phase indicating waves but whose voltage excursions or swings are limited to fixed amplitudes and are referenced, not around a fixed voltage reference, but about a voltage axis which varies with the voltage across the capacitor. Thus, equilibrium, that is when the net incremental charge on the capacitor as a result of the oppositely going portions of one cycle of the phase indicating wave is zero, is reached only at the desired phase relation between the reference and drum pulses.

A further aspect of the present invention contemplates a phase stabilizing loop wherein the drum motor is driven by oscillations derived from and tied to the reference frequency and which are retarded or advanced in response to a phase discriminator which compares the reference and drum pulses.

It is therefore an object of the present invention to provide a phase stabilizing system having a high degree of accuracy.

Another object of the invention is to improve the accuracy of a phase stabilizing system wherein time discrimination is obtained by integrating a relative time differential parameter derived from a reference frequency signal and a phase controllable cyclic occurrence by applying to the integrator a voltage wave containing the time parameters indicative of the phase relation between the reference frequency and the cyclic occurrence and also having fixed predetermined voltage swings about a voltage axis which varies with the voltage across the output of the integrator.

Another object of the invention is to improve the accuracy of a phase stabilizing system wherein time discrimination is obtained by varying the average D.C. level on a capacitor as a function of a relative time differential parameter derived from a reference frequency and a phase controllable cyclic occurrence, by subjecting the capacitor charging circuit to a voltage wave containing the time parameters indicative of the phase relation between the reference frequency and the cyclic occurrence and also having fixed predetermined voltage swings about a voltage level which varies with the voltage across the capacitor at all times.

Another object of the invention is to improve the accuracy of a phase stabilizing system wherein time discrimination is obtained by varying the average D.C. level on a capacitor as a function of a relative time differential parameter derived from a reference frequency and a phase controllable cyclic occurrence by subjecting the capacitor charging circuit to current changes which are linear with time rather than exponential.

Another object of the invention is to provide an improved phase stabilizing loop wherein the power input to the device having the cyclic output whose phase is to be regulated is energized by oscillations derived from the reference frequency.

A further object of the invention is to provide an improved phase stabilizing loop wherein the power input to the device having the cyclic output whose phase is to be regulated is energized by oscillations derived from the reference frequency and which are retarded or advanced by a variable delay in response to a phase discriminator which compares the reference frequency and the cyclic output.

Further objects and advantages of the present invention will be apparent from the following description, reference being had to the accompanying drawings wherein a preferred form of the invention is shown.

In the drawings:

FIG. 1 is a diagram, partly block and partly schematic, of drum synchronizing apparatus embodying a preferred form of the invention;

FIG. 2 is a chart showing wave forms of the various phases of the drum pulses and also wave forms of the voltages across the integrating circuit for the respective drum pulse positions shown when the variable reference circuit is disconnected from the apparatus; and FIG. 3 is a chart of wave forms showing drum pulse phase relations and also the respective voltages across the integrator circuit associated with each drum pulse position shown when the variable reference circuit is connected in the apparatus.

While the frequency is the same in FIGS. 2 and 3, the time base of the latter figure is expanded.

Referring now to the drawings there is shown in FIG. 1, a magnetic storage drum 10 whose instantaneous angular position is to be stabilized relative to a reference frequency signal provided by a reference oscillator 12, for example, the master clock of a computer. The drum 10 is driven by synchronous motor 14, for example, a hysteresis motor, which is powered by periodic oscillatory energy derived from and related to the reference frequency from the oscillator 12 through a control circuit 16 which includes a frequency divider 18, a voltage responsive adjustable delay circuit 20, an amplifier 22, a circuit 24 for converting the amplified output pulses of the delay 20 to sinusoidal energy, and an amplifier 26. By way of example, the delay 20 may be a monostable or the one-shot circuit shown which generates rectangular pulses of the same frequency as those applied to its input but whose lagging edges may be advanced or retarded in time by appropriately increasing or decreasing the voltage supplied along a conductor 28 to the delay 20. In order to produce for the motor input a sinusoidal wave related to the adjustable lagging edges of the output pulses of the delay 20, the circuit 24 may include a pulse former 30, such as a monostable multivibrator or a differentiator for providing sharp pulses corresponding in time to and in response to the lagging edges of the output waves from the amplifier 22. A square wave generator 32 such as a flip-flop, connects the output pulses from the pulse former 30 into square waves which are converted to sine waves by an appropriate filter 34. It will be appreciated that in case pulse former 30 is a differentiator producing oppositely going pulses, in response to leading and lagging edges of its input waves, the flip-flop 32 will respond only to input pulses of the polarity of interest. The frequency divider 18 is employed only when necessary to reduce the reference frequency from the oscillator 12 to a frequency which, when further divided by the flip-flop 32, provides the operating frequency of the motor 14, the latter usually having an input frequency that is much lower than the output frequency of the master clock of a computer.

It will be apparent from the aforesaid description that the control circuit 16 supplies the motor 14 with a voltage of the proper operating frequency derived from and tied to the reference frequency signal of the oscillator 12, and that the phase or time position of the drum 10 may be retarded or advanced by retarding or advancing the phase of the voltage supplied to the motor 14 in response to appropriate changes of control voltage applied through conductor 28 to the adjustable delay 20.

The control voltage for appropriately decreasing or increasing the delayage of the delay 20 as required for phase correction is supplied to the conductor 28 from the output of a phase discriminator 36 which compares reference pulses from the oscillator 12 with the marker pulses derived from the drum 10 and produces an output voltage on conductor 28 that varies in accordance with the divergence, if any, from the desired phase relation between the reference pulses and the drum pulses. The marker pulses may be picked off the drum by means of an electromagnetic pickup head 38 positioned in inductive relation with the drum surface and in line with a drum track along which the marker pulses are stored as minute magnetized areas. The actual techniques and apparatus relating to the storage and read-out of data pulses in a magnetic storage drum are well known and need no explanation. In normal operation with the drum rotation at the correct speed, the marker pulses derived from the drum have the same frequency as the reference pulses from the reference oscillator 12.

Included in the phase discriminator 36 is a rectangular wave generator 40, for example, a flip-flop, which in response to the reference pulses and the drum pulses, respectively received at its set and reset input terminals 42 and 44 provides at its output 46 a rectangular wave having oppositely going portions (due to on and off times of flip-flop) whose respective time durations are related to the phase relation between the reference and drum pulses. For example, the time durations of the oppositely going portions are equal or symmetrical when the drum pulses occur midway between the reference pulses. Any deviation from this relation will be reflected in a responsive time dissymmetry of the rectangular wave produced by the rectangular wave generator 40, which as hereinbefore stated may be referred to as a phase comparator.

In order to provide an output voltage on conductor 28 which varies in accordance with the differential between the respective time durations of the oppositely going portions of the rectangular output wave from the flip-flop 40, the wave is applied to what may be called a time dissymmetry discriminator 48 through a partly shown amplifier 50. In the time discriminator circuit 48 there is an integrating circuit 52 which includes a resistor 54 in series with a capacitor 56, and which is connected across the rectangular wave output of the amplifier 50 through a resistor 58, the latter being connected through a junction 60 to resistor 54. To limit the voltage swings of the amplifier output 50 across the integrating circuit 52 to fixed excursions around a voltage axis whose level varies with the voltage level across the capacitor, a double-ended clipper 61 in the form of back-to-back Zener diodes 62 and 64 limits the oppositely going excursions of the rectangular output wave to the Zener voltages of the diodes, and the reference around which the limiting occurs is supplied in response to the voltage level of the capacitor through an isolating circuit in the form of an emitter follower amplifier 66 whose input is connected across the capacitor 56. A Zener diode has the characteristic of conducting readily in one direction but being substantially nonconductive in the reverse direction when the voltage applied in said reverse direction is below a critical or breakdown value. When the voltage applied in the reverse direction exceeds this value, the device conducts well in the reverse direction. Thus, with switch 76 closed as shown, the potential at point 60 can never differ in either direction from that at point 72 by more than the breakdown voltage of one of the Zener diodes 62, 64, because when such a potential difference is attained, both diodes will conduct and effectively connect points 60 and 72 together through the voltage drop of the reversely conducting diode.

By way of example, the amplifier 66 is shown as having two cascaded emitter-follower transistor stages including an input PNP transistor 68 and an output NPN transistor 70 whose input is connected to the emitter-follower output of transistor 68. As compared to the use of one emitter-follower, the two cascaded emitter-follower transistors provide a higher input impedance to further reduce loading on the capacitor, and also provide compensation of base-to-emitter voltage drops, which, being in opposite directions in the two transistors, substantially cancel out. The output terminal 72 of the amplifier 66 supplies a reference voltage which will vary in accordance with the variations of the voltage level across the capacitor 56. This variable reference voltage is in series with the clipper 61 in a variable reference circuit 74 effectively connected across the integrating circuit 52 through a switch 76. The output terminal 72 is also connected to conductor 28 to supply to the control circuit 16 a control voltage which varies with the average D.C. level of the capacitor 56, which in turn is responsive to the phase relation between the reference and drum pulses. Depending on the phase relation sensed by the discriminator 36, the control voltage supplied from the terminal 72 to the variable delay 20 is such as to increase or decrease the delay time of the delay as necessary in order to retard or advance the phase of the drum motor input supply as needed to correct for any deviation of the drum position from the desired phase relation. In the example shown, if the voltage at 72 becomes less negative, the delay time of delay 20 is decreased and vice versa.

In order to illustrate the advantage of applying to the integrator circuit a comparator wave which has fixed voltage excursions around a voltage axis that varies in accordance with the voltage of the integrator output, the operation of the apparatus will first be considered employing a charging voltage across the integrator circuit which varies around a fixed reference. This may be effected in the illustrated circuit by considering the circuit with the switch 76 in open position, thus disconnecting the variable reference circuit 74 from the integrator. With the switch 76 open, the resistors 54 and 58 will be considered as one resistor. Because the emitter follower has very near unity gain and in order to simplify the explanation, it will be considered that the amplifier 66 has unity gain, that is, that the voltage at its output terminal 72 is the same as the voltage across the capacitor 56 at all times. Let it further be considered that the voltage extremes of the comparator rectangular waves applied across the integrating circuit 52 are 0 and −24 volts, and that the desired phase relation between the reference pulses and the drum pulses is that with the drum pulses midway between the reference pulses.

Referring to FIG. 2, the curves A and B illustrate the arbitrary desired phase relation wherein the reference and drum pulses are 180° apart, that is, the drum pulses are midway between the reference pulses. Curve C illustrates that the comparator output wave, produced in response to the phase relation shown in curves A and B and applied across the integrating circuit, is indicative of the desired phase relation in that the rectangular waves are symmetrical with respect to time, that is, the respective oppositely going portions 78 and 80 have the same time duration. The charges deposited on the capacitor during the negative and positive going portions of the applied voltage are proportional to volts×time and are indicated by the shaded areas 82 and 84, which being equal, by reason of the voltage and time symmetry for the particular condition illustrated, indicate that the capacitor is at equilibrium, that is, the net incremental charge over the oppositely going portions of the applied voltage wave is zero.

While the drum is coming up to speed after the apparatus has been turned on, the average lengths of the positive and negative going portions of the comparator output wave applied across the integrating circuit 52 are equal and the capacitor will charge to −12 v., the mean voltage between the voltage extremes of the comparator wave, but when the synchronous motor 14 locks in, the drum pulses may not be exactly midway between the reference pulses for either of the following reasons: (1) If the drum motor is a hysteresis motor or the like, the induced poles in the motor rotor may be located at positions of the rotor different than those when the motor was run previously. (2) The components in the drum drive control circuits may have changed characteristics because of changes in the environment or aging and therefore may produce a different effective control signal than previously. If at lock-in the drum pulses are not midway between the reference pulses, and recalling that at the instant just before lock-in the capacitor was charged to −12 volts, the capacitor will from this level start charging toward the polarity having the greater width (time duration) in the comparator output wave applied across the integrating circuit, causing the control circuit 16 to advance or retard the drum pulses in the direction of wave symmetry relative to time, and equilibrium will occur when the widths of the positive and negative going portions of the comparator output wave are such that they deposit equal amounts of charge on the capacitor, which condition may occur when the reference and drum pulses are not in the proper phase relation.

Let it be supposed that as the drum came up to speed and because of the aforesaid possible reasons, motor lock-in occurred with the drum in the phase relation depicted in curve D (FIG. 2) which illustrates drum pulses lagging the desired normal phase relation. For this condition, the comparator voltage wave applied across the integrating circuit is that shown in curve E. As hereinbefore noted, the capacitor is at a −12 volt level at the instant before lock-in occurs, and from this level is driven positive, that is, toward the polarity of the comparator wave having the greater width (time). As the capacitor is driven positive (toward the polarity of the comparator wave having the greater width), less and less amplitude of positive voltage swing is applied to the integrating circuit and more and more amplitude of negative going swing is applied across the integrator circuit, thus causing equilibrium to be reached before the rectangular wave reaches symmetry in time. Thus, the loop reaches stability when the drum pulses are still lagging the desired phase relation, as illustrated in curves F and G. In curve G, the shaded areas being equal indicate that equal amounts of charge are being deposited by the negative and positive going portions of the comparator output wave applied across the integrating circuit.

Next, the operation of the circuit will be considered with the variable reference circuit 74 connected across the integrating circuit by closing switch 76 as indicated in FIG. 1. As an example, consider that the reverse breakdown voltage of each of the Zener diodes 62 and 64 is 5 volts. Let it be supposed that the drum is coming up to speed and locks in with the lag shown by curves H and I of FIG. 2, which illustrate the same phase relation as curves A and D of FIG. 1. Now, as shown in curve J (FIG. 2), the voltage swings of the negative and positive going portions of the comparator output wave applied across the integrating circuit 52 have been limited to 5 volts by the Zener diodes, and the 5 volt swings occur around a voltage axis which varies in accordance with the voltage across the capacitor, and if amplifier 66 is considered a unity gain amplifier, the reference level around which the voltage applied across the integrating circuit 52 oscillates is the same as the capacitor voltage level. Now, as the capacitor 56 is driven positive, the swings around the capacitor level remain fixed and the capacitor will reach equilibrium when the rectangular comparator output waves are symmetrical, that is, the durations of the oppositely going portions are equal, as shown by curves M and N (FIG. 2). Curves K and L illustrate a transitional stage between curves J—J and M—N. Thus, the net incremental charge deposited on the condenser 56 over the positive and negative going portions of the applied voltage wave is dependent solely on the difference between the time durations of the oppositely going portions of the wave, and is independent of the voltage across the capacitor.

Although there is a slight loss in an emitter-follower, the amplifier 66 provides a reference voltage which is substantially close to the capacitor level, and in addition it provides adequate circuit isolation and high input impedance. However, a true unity gain amplifier providing adequate circuit isolation and a high input impedance may be employed at 66. The important thing is circuitry which provides a reference voltage that varies as the voltage of the capacitor varies.

In the described operational example wherein the drum and reference pulses were evenly spaced, the clipping circuit 61 was symmetrical to provide fixed equal voltage swings around the varying reference level. However, if desired, the fixed voltage swings around the varying reference level may be made unequal in order to maintain a phase relation wherein the reference and drum pulses, although of the same frequency, are not evenly spaced apart. This may be effected by selecting Zener diodes 62 and 64, having different Zener or reverse breakdown voltages, i.e., one diode having a higher Zener voltage than that of the other diode. Whatever the ratio of the fixed voltage swings around the varying reference level, the regulating loop will always stabilize at the same phase relation dictated by the particular ratio.

In a particular operative example, components in the phase discriminator had the following values:

| | | |
|---|---|---|
| B1 | volts | 24 |
| B2 | do | 24 |
| Resistors 58 and 88 | ohms | 100,000 |
| Resistors 54 | do | 240,000 |
| Resistors 86 and 90 | do | 4,700 |
| Capacitor 56 | mf | 20 |
| Transistors 50 and 68 | | 2N123 |
| Transistors 70 | | 2N183 |

An adjustable resistor 92 may be adjusted to provide current to balance out capacitor leakage current and input current to the transistor 68.

While the form of the embodiment of the invention as herein disclosed constitutes a preferred form, it is to be understood that other forms might be adopted, all coming within the scope of the claims which follow.

What is claimed is:

1. Apparatus for maintaining a predetermined phase relation between a reference frequency and the cyclic output of a device having control means for advancing or retarding the phase of the cyclic output in response to appropriate control signals, said apparatus comprising means responsive to the reference frequency and the cyclic output for providing a voltage wave having oppositely going portions indicative of the phase relation between the reference frequency and the cyclic output, an integrating circuit, means for applying said voltage wave to said integrating circuit, means responsive to the output voltage of the integrating circuit for causing said oppositely going portions to oscillate about a reference voltage which varies in accordance with the output voltage of the integrating circuit, and means responsive to the latter voltage for applying appropriate control signals to said control means to advance or retard the phase of said cyclic output as may be required to stabilize the phase thereof in said predetermined desired phase relation with the reference frequency.

2. Apparatus for maintaining a predetermined phase relation between a reference frequency and the instantaneous position of a cycling data storage device having control means for advancing or retarding the instantaneous position of the device in response to an appropriate control signal, said apparatus comprising means responsive to the reference frequency and the cycling of the device for providing a voltage wave having oppositely going portions indicative of the phase relation between the reference frequency and the position of the device, an integrating circuit, means for applying said voltage wave to said integrating circuit, means responsive to the integrating circuit output for causing said oppositely going portions to have fixed amplitude swings at all times about a reference voltage which varies in accordance with the integrating circuit output, and means responsive to the latter output for applying appropriate control signals to said control means to advance or retard the phase of said device as may be required to stabilize the phase thereof in said predetermined desired phase relation with the reference frequency.

3. Apparatus for maintaining a predetermined phase relation between a reference frequency and the cyclic output of a device having control means for advancing or retarding the phase of the cyclic output in response to appropriate control signals, said apparatus comprising means responsive to the reference frequency and the cyclic output for providing a voltage wave having oppositely going portions indicative of the phase relation between the reference frequency and the cyclic output, an integrating circuit including a resistor in series with the capacitor, means for applying said voltage wave to said integrating circuit, means responsive to the voltage across the capacitor for causing said oppositely going portions to oscillate about a reference voltage which varies in accordance with the voltage across the capacitor, and means responsive to the voltage across said capacitor for applying appropriate control signals to said control means to advance or retard the phase of said cyclic output as may be required to stabilize the phase thereof in said predetermined relation with the reference frequency.

4. In an apparatus for maintaining a desired phase relation between a reference frequency and a phase-controllable cyclic output of a device, and which includes means responsive to said reference frequency and said cyclic output for providing a train of waves having oppositely going portions whose time durations are indicative of the phase relation between the reference frequency and the cyclic output, and which further includes an integrator whose output voltage level is made to vary as a function of the differential between the time durations of said respective oppositely going wave portions, and which further includes a control circuit responsive to said integrator output level for controlling said device to regulate the phase of its cyclic output, a circuit for controlling the voltage applied to said integrating circuit comprising means for limiting the voltage swings of said waves, means for applying said limited waves to said integrating circuit, and means responsive to said integrator output level for causing said clipped waves to swing around a voltage level which varies in accordance with said integrator output level.

5. In an apparatus for maintaining a desired phase relation between a reference frequency and a phase-controllable cyclic output of a device, and which includes means responsive to said reference frequency and said cyclic output for providing a train of voltage waves having oppositely going portions whose time durations are indicative of the phase relation between the reference frequency and the cyclic output, and which further includes a capacitor whose average D.C. level is made to vary as a function of the differential between the time durations of said respective oppositely going wave portions, and which further includes a control circuit responsive to said capacitor level for controlling said device to regulate the phase of its cyclic output, a circuit for controlling the charge on said capacitor comprising an integrating circuit including said capacitor and a resistor in series therewith, a double-ended clipping circuit for limiting the voltage swings of said waves, means for applying said clipped waves to said integrating circuit, and means responsive to the voltage across said capacitor for causing the oppositely going excursions of said clipped waves to swing around a voltage level which varies in accordance with the voltage across said capacitor.

6. Apparatus for maintaining a predetermined phase relation between a reference frequency signal and the cyclic output of a device which may be controlled to retard or advance the phase of its cyclic output, said apparatus comprising means responsive to said reference frequency signal and said cyclic output for providing waves having respective oppositely going portions, the relation of the durations of the respective oppositely going portions being indicative of the phase relations between the reference frequency and the cyclic output, an integrating circuit, means for limiting the voltage swings of said waves, means for applying said limited waves to said integrating circuit, means responsive to the output voltage of said integrating circuit for causing said limited waves to swing symmetrically around a voltage level which varies in accordance with the output voltage of the integrating circuit, means responsive to the latter voltage for controlling said device to make the appropriate phase correction.

7. Apparatus for maintaining a predetermined phase relation between a reference frequency signal and the cyclic output of a device which may be controlled to retard or advance the phase of its cyclic output, said apparatus comprising means responsive to said reference frequency signal and said cyclic output for providing waves having respective oppositely going portions, the relation of the durations of the respective oppositely going portions being indicative of the phase relations between the reference frequency and the cyclic output, an integrating circuit including a resistor and a capacitor connected in series therewith, double-ended clipping means for limiting the voltage swings of said waves, means for applying said clipped waves to said integrating circuit, means responsive to the voltage across said capacitor for causing said clipped waves at all times to swing symmetrically around a voltage level substantially equal to the voltage across the capacitor, and means responsive to said capacitor voltage for controlling said device to make the appropriate phase correction.

8. In an apparatus for maintaining a predetermined phase relation between a reference frequency and the cyclic output of a generator of cyclic occurrences, the time phase of said generator output being adjustable in response to adjustment of control energy supplied to the generator, voltage responsive control means for controlling said energy supplied to the generator, a rectangular wave generator responsive to the receipt of signals representing said reference frequency and said cyclic output for generating rectangular waves whose degree of time dissymmetry is indicative of the phase relation between the reference frequency and the cyclic output, and a rectangular wave symmetry discriminator responsive to the output of said rectangular wave generator for supplying to said control means a voltage indicative of the degree of symmetry of the output waves of said rectangular wave generator, said discriminator comprising a first resistor having one end connected to one side of the output of said rectangular wave generator and its other end connected to a junction, a second resistor having one end connected to said junction, a capacitor having one end connected to the other side of the rectangular wave generator output and its other end connected to the other end of said second resistor, high input impedance circuit means responsive to the voltage across said capacitor for providing at the output of the circuit means a reference voltage which varies with the voltage across said capacitor, and means for limiting the swings of said rectangular waves at said junction to fixed voltage swings around said reference voltage.

9. In an apparatus for maintaining a predetermined phase relation between a reference frequency and the cyclic output of a generator of cyclic occurrences, the time phase of said generator output being adjustable in response to adjustment of control energy supplied to the generator, voltage responsive control means for controlling said energy supplied to the generator, a rectangular wave generator responsive to the receipt of signals representing said reference frequency and said cyclic output for generating rectangular waves whose degree of time symmetry is indicative of the phase relation between the reference frequency and the cyclic output, and a rectangular wave symmetry discriminator responsive to the output of said rectangular wave generator for supplying to said control means a voltage indicative of the degree of symmetry of the output waves of said rectangular wave generator, said discriminator comprising a first resistor having one end connected to one side of the output of said rectangular wave generator and its other end connected to a junction, a second resistor having one end connected to said junction, a capacitor having one end connected to the other side of the rectangular wave generator output and its other end connected to the other end of said second resistor, emitter follower means responsive to the voltage across said capacitor for providing at the emitter follower output a reference voltage which varies with the voltage across said capacitor, constant voltage bi-polar reference means, means coupling said junction, said bi-polar reference means and said emitter follower output, for limiting the swings of said rectangular waves at said junction to fixed voltage swings around said reference voltage.

10. Apparatus for maintaining a predetermined phase relation between the output of a reference frequency source and the cyclic output of a generator of cyclic occurrences, the time phase of said generator output being adjustable in response to phase adjustment of the input energy supplied to the generator, said apparatus comprising means for supplying energy from the output of said source to the input of the generator, voltage responsive control means for controlling the phase of said energy supplied to the generator, a rectangular wave generator responsive to the receipt of signals representing said reference frequency and said cyclic output for generating rectangular waves whose degree of time symmetry is indicative of the phase relation between the reference frequency and the cyclic output, and a rectangular wave symmetry discriminator responsive to the output of said rectangular wave generator for supplying to said control means a voltage indicative of the degree of symmetry of the output waves of said rectangular wave generator, said discriminator comprising a first resistor having one end connected to one side of the output of said rectangular wave generator and its other end connected to a junction, a second resistor having one end connected to said junction, a capacitor having one end connected to the other side of the rectangular wave generator output and its other end connected to the other end of said second resistor, high input impedance circuit means responsive to the voltage across said capacitor for providing at the output of the circuit means a reference voltage which varies with the voltage across said capacitor, constant voltage bi-polar reference means, means coupling said junction, said bi-polar reference means and the output of said circuit means, for limiting the swings of said rectangular waves at said junction to fixed voltage swings around said reference voltage.

11. Apparatus for maintaining a predetermined phase relation between the output of a reference frequency signal source and the cyclic output of a generator of cyclic occurrences whose output time phase is controllable by controlling the time phase of its input energy, said apparatus comprising a phase discriminator for detecting the time phase difference between the reference signal and said cyclic occurrences, a delay whose delayage is changeable in response to the output of said discriminator, and a circuit coupled from the reference source to the input of said generator for energizing the generator in response to the reference source, said circuit including said delay interposed between the reference source and the input of the generator, said phase discriminator comprising means responsive to said reference signal and said cyclic output for providing first waves having respective oppositely going portions whose relative time durations are indicative of the phase relations between the reference signal and the cyclic output, an integrating circuit, and means for applying to said integrating circuit a voltage wave having the time parameters of said first waves and having oppositely going fixed voltage swings around a reference voltage axis which varies in accordance with the output voltage of the integrating circuit.

12. Apparatus for maintaining a predetermined phase relation between the output of a reference frequency signal source and the cyclic output of a generator of cyclic occurrences and whose output time phase is controllable by controlling the time phase of its input energy, said apparatus comprising a phase discriminator for detecting the time phase difference between the reference signal and said cyclic occurrences, a delay whose delayage is changeable in response to the output of said discriminator, and a circuit coupled from the reference source to the input of said generator for energizing the generator in response to the reference source, said circuit including said delay interposed between the reference source and the input of the generator, said phase discriminator comprising means responsive to said reference signal and said cyclic output for providing first waves having respective oppositely going portions whose relative time durations are indicative of the phase relation between the reference signal and the cyclic output, an integrating circuit, bi-polar constant voltage reference means, means for providing a variable reference which varies in accordance with the ouput of the integrating circuit, and means responsive to said first waves, said bi-polar constant voltage reference means, and said variable reference, for applying to the integrating circuit a voltage wave having the time parameters of said first wave and having oppositely going fixed voltage swings around said variable reference.

References Cited in the file of this patent

UNITED STATES PATENTS

| | | |
|---|---|---|
| 2,797,387 | Johnson | June 25, 1957 |
| 2,803,792 | Turner | Aug. 20, 1957 |
| 2,881,377 | Apa et al. | Apr. 7, 1959 |